(12) United States Patent
Sasaki et al.

(10) Patent No.: US 10,578,885 B2
(45) Date of Patent: Mar. 3, 2020

(54) POLARIZATION COUPLING DEVICE AND OPTICAL MODULATION DEVICE

(71) Applicant: Fujitsu Optical Components Limited, Kawasaki-shi, Kanagawa (JP)

(72) Inventors: Seimi Sasaki, Sagamihara (JP); Hiroshi Kato, Kawasaki (JP); Kohei Shibata, Isehara (JP); Takehito Tanaka, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/868,332

(22) Filed: Jan. 11, 2018

(65) Prior Publication Data

US 2018/0196277 A1   Jul. 12, 2018

(30) Foreign Application Priority Data

Jan. 12, 2017   (JP) .................. 2017-003697

(51) Int. Cl.
| | | |
|---|---|---|
| *G02B 5/30* | (2006.01) | |
| *G02B 27/28* | (2006.01) | |
| *G02B 6/27* | (2006.01) | |
| G02B 6/28 | (2006.01) | |
| G02B 6/26 | (2006.01) | |

(52) U.S. Cl.
CPC .......... *G02B 27/285* (2013.01); *G02B 6/272* (2013.01); *G02B 6/2706* (2013.01); *G02B 27/283* (2013.01); *G02B 6/262* (2013.01); *G02B 6/28* (2013.01)

(58) Field of Classification Search
CPC .. G02B 27/283; G02B 5/3083; G02B 27/286; G02B 6/2773; G02B 2027/0178

USPC .................................................. 359/489.09
See application file for complete search history.

(56) References Cited

U.S. PATENT DOCUMENTS

| | | | | |
|---|---|---|---|---|
| 5,124,841 A | * | 6/1992 | Oishi .................. | G02B 27/283 359/485.02 |
| 5,321,539 A | * | 6/1994 | Hirabayashi ............ | G02F 1/216 349/1 |
| 2004/0105150 A1 | * | 6/2004 | Yatsu .................. | G02B 27/283 359/489.08 |
| 2007/0279738 A1 | * | 12/2007 | Suh ........................ | G02B 6/272 359/487.02 |

(Continued)

FOREIGN PATENT DOCUMENTS

| | | |
|---|---|---|
| JP | 5-133800 | 5/1993 |
| JP | 2015-169796 | 9/2015 |
| JP | 2015-225263 | 12/2015 |

*Primary Examiner* — William R Alexander
*Assistant Examiner* — Tamara Y. Washington (57) ABSTRACT

A polarization coupling device includes a polarization combining element. The polarization combining element includes a polarization rotating unit that rotates a polarization direction of a first polarized wave incident on the polarization combining element, and a polarization combining unit that combines the first polarized wave with the polarization direction rotated by the polarization rotating unit and a second polarized wave incident on the polarization combining element with each other, and the polarization rotating unit and the polarization combining unit are integrated with each other. Due to this configuration, the polarization coupling device has an effect where downscaling of the device can be advanced.

6 Claims, 5 Drawing Sheets

(56) References Cited

U.S. PATENT DOCUMENTS

2012/0038973 A1\* 2/2012 Martinez, III ........... G02B 7/00
                                                      359/326
2012/0250136 A1\* 10/2012 Maie .................... G02B 6/4213
                                                      359/279
2015/0253582 A1   9/2015 Sasaki et al.

\* cited by examiner

POLARIZATION COUPLING DEVICE AND OPTICAL MODULATION DEVICE

CROSS-REFERENCE TO RELATED APPLICATION

This application is based upon and claims the benefit of priority of the prior Japanese Patent Application No. 2017-003697, filed on Jan. 12, 2017, the entire contents of which are incorporated herein by reference.

FIELD

The embodiments discussed herein are related to a polarization coupling device and an optical modulation device.

BACKGROUND

In an optical transmission system, for example, there is a case where an optical modulator that performs optical modulation with the DP-DQPSK (Dual Polarization Differential Quadrature Phase Shift Keying) method is used. In the DP-DQPSK method, a light beam input to the optical modulator is first split into two light beams, and an electric signal is superimposed on the two split light beams. The two light beams having the electric signal superimposed thereon are then combined with each other.

In order to superimpose an electric signal on two split light beams, a ferroelectric crystal such as lithium niobate (LiNbO3) is sometimes used. In a case of using a ferroelectric crystal, because an electric signal is superimposed on the light beams in a waveguide within the crystal, crystals with a predetermined size are arranged, and therefore there is a certain limit on downscaling of optical modulators. In this connection, in recent years, an optical modulator that uses a semiconductor chip has been studied in order to achieve downscaling and high efficiency of optical modulators.

Further, in order to combine two light beams having an electric signal superimposed thereon, a polarization coupling unit including a polarization rotating element and a polarization combining element is sometimes used. The polarization coupling unit rotates the polarization direction of one of two light beams that travel in parallel to each other with the polarization rotating element such as a waveplate, and combines two light beams of which the polarization directions are perpendicular to each other with the polarization combining element such as a PBC (Polarization Beam Combiner) prism with each other.

Specifically, a polarization beam splitter film is formed on the PBC prism. The polarization beam splitter film is a reflection film with polarization selectivity. The polarization beam splitter film transmits light with its polarization plane parallel to an incident surface of the film (P-polarized light), and reflects light with its polarization plane perpendicular to the incident surface (S-polarized light). As a polarized wave of one light beam transmits the waveplate, the waveplate rotates the polarization direction of the one light beam to make it perpendicular to the polarization direction of the other light beam. That is, the polarized wave of the one light beam is turned from P-polarized light to S-polarized light.

Figure 7:
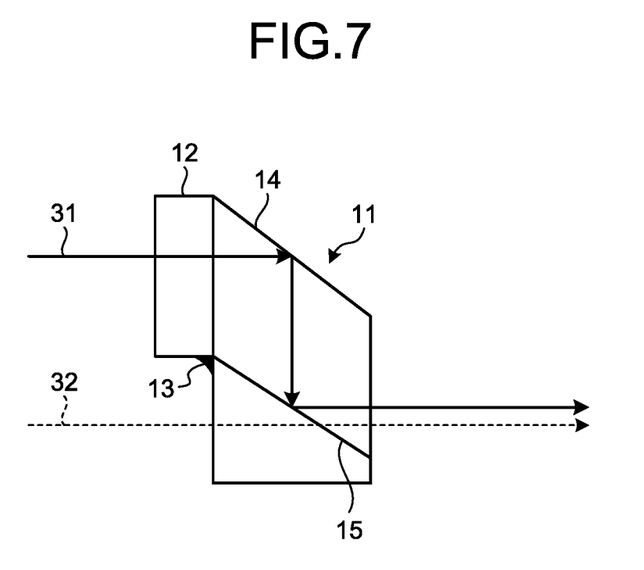
FIG. 7 is a top view illustrating an example of a configuration of a polarization coupling unit.

For example, as illustrated in FIG. 7, a light beam 31 (a solid line in FIG. 7) and a light beam 32 (a dotted line in FIG. 7) are incident on the polarization coupling unit as P-polarized light. The polarized wave of the light beam 31 passes through a waveplate 12, so that the waveplate 12 rotates the polarization direction of the light beam 31 to make it perpendicular to the polarization direction of the light beam 32. That is, the polarized wave of the light beam 31 is turned from P-polarized light to S-polarized light. A reflection film 14 and a polarization beam splitter film 15 reflect the polarized wave of the light beam 31 incident from the waveplate 12 on a PBC prism 11. The polarization beam splitter film 15 transmits the polarized wave of the light beam 32 incident on the PBC prism 11. The PBC prism 11 combines the light beam 31 reflected by the reflection film 14 and the polarization beam splitter film 15 and the light beam 32 transmitted through the polarization beam splitter film 15 with each other.

In the configuration of the polarization coupling unit described above, as illustrated in FIG. 7, it is a common procedure to bond the waveplate 12 to the PBC prism 11. For example, the waveplate 12 is fixed to the PBC prism 11 with a fixing agent such as an adhesive. In this case, the fixing agent applied onto a bonding surface between the waveplate 12 and the PBC prism 11 may spread out of the bonding surface to a surrounding region to form a region, which is referred to as "fillet 13".

The fillet 13 formed of the fixing agent in the surrounding region of the bonding surface between the PBC prism 11 and the waveplate 12 blocks traveling of light beams. Therefore, in a case of combining two light beams with the polarization beam coupling unit, the incident positions of the two light beams are adjusted in such a manner that the light beams travel along paths that bypass the fillet 13. Specifically, the light beam 32 is made incident on the PBC prism 11 at a position away from the surrounding region of the bonding surface between the PBC prism 11 and the waveplate 12. By adjusting the incident position of the light beam 32 in this manner, traveling of the light beam 32 is not blocked by the fillet 13.

Patent Document 1: Japanese Laid-Open Patent Publication No. 05-133800

Patent Document 2: Japanese Laid-Open Patent Publication No. 2015-169796

However, in a case where two light beams are input to such a polarization coupling unit, there is a problem that it is not possible to reduce the distance between the two light beams to a certain value or less. For example, in the polarization coupling unit illustrated in FIG. 7, the light beam 32 is made incident on the PBC prism 11 at a position away from the surrounding region of the bonding surface between the PBC prism 11 and the waveplate 12, and therefore a gap with a certain size is provided between the light beam 31 and the light beam 32.

Figure 8:
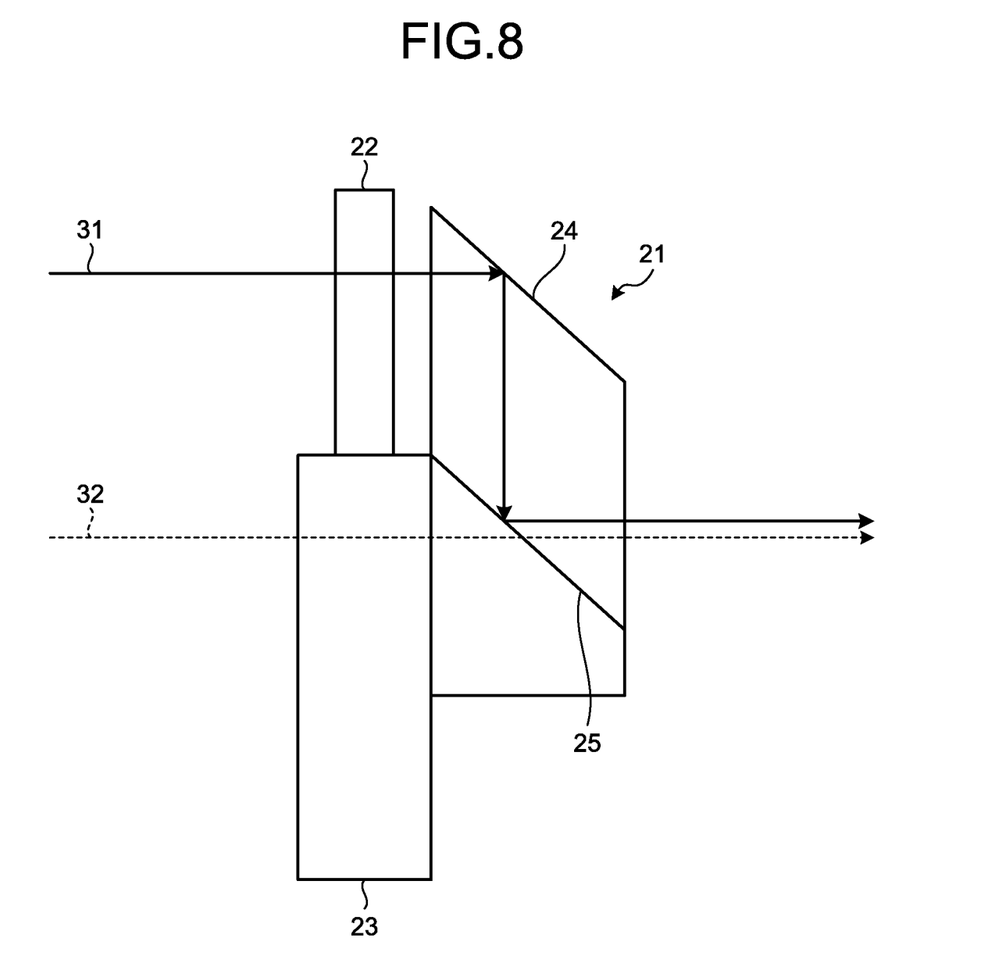
FIG. 8 is a top view illustrating an example of a configuration of a polarization coupling unit.

In order to solve the problem of the polarization coupling unit illustrated in FIG. 7, that is, in order to reduce the distance between the two light beams, there has been conventionally proposed a polarization coupling unit that further includes a base member for fixing a polarization rotating element and a polarization combining element. Specifically, as illustrated in FIG. 8, for example, a base member 23 has a main body and two arms extending from the main body, and a cutout portion is formed between the two arms. A waveplate 22 is bonded to end faces of the two arms of the base member 23. To one surface of the two arms and the main body of the base member 23, a PBC prism 21 is bonded at a position opposed to the waveplate 22 and the cutout portion of the base member 23. The base member 23 is a base member to which the PBC prism 21 and the waveplate 22 are bonded. For example, the base member 23 is formed of a glass material, the PBC prism 21 is formed of quartz glass, and the waveplate 22 is formed of a quartz crystal. In addition, a reflection film 24 and a polarization beam splitter film 25 are formed on the PBC prism 21.

On the polarization coupling unit illustrated in FIG. 8, similarly to the polarization coupling unit illustrated in FIG. 7, the light beams 31 and 32 are made incident as P-polarized light. As the polarized wave of the light beam 31 passes through the waveplate 22, the waveplate 22 rotates the polarization direction of the light beam 31 to make it perpendicular to the polarization direction of the light beam 32. That is, the polarized wave of the light beam 31 is turned from P-polarized light to S-polarized light. The reflection film 24 and the polarization beam splitter film 25 reflect the polarized wave of the light beam 31 incident on the PBC prism 21 from the waveplate 22. The polarization beam splitter film 25 transmits the polarized wave of the light beam 32 incident on the PBC prism 21 from the cutout portion of the base member 23. The PBC prism 21 combines the light beam 31 reflected by the reflection film 24 and the polarization beam splitter film 25 and the light beam 32 having transmitted through the polarization beam splitter film 25 with each other.

Because the waveplate 22 and the PBC prism 21 are bonded to the base member 23 in the polarization beam coupling unit illustrated in FIG. 8, the waveplate 22 and the PBC prism 21 are not directly bonded to each other. Because there is no portion that bonds the waveplate 22 and the PBC prism 21 to each other, there is no fillet formed of a fixing agent such as an adhesive. Therefore, even if the distance between two light beams is reduced to a certain value or less, traveling of the light beam 32 is not blocked by a fillet.

However, in the polarization coupling unit illustrated in FIG. 8, the base member 23 is provided as a new component in order to solve the problem of the polarization coupling unit illustrated in FIG. 7, and this results in increase of the number of components. As a result, in a case of applying the polarization coupling unit illustrated in FIG. 8 to a device such as an optical modulator, the base member 23 is manufactured in order to reduce the distance between two light beams having an electric signal superimposed thereon. This configuration makes it difficult to sufficiently downscale the optical modulator.

SUMMARY

According to an aspect of an embodiment, a polarization coupling device includes a polarization combining element. the polarization combining element includes a polarization rotating unit that rotates a polarization direction of a first polarized wave incident on the polarization combining element, and a polarization combining unit that combines the first polarized wave having a polarization direction thereof rotated by the polarization rotating unit and a second polarized wave incident on the polarization combining element with each other, and the polarization rotating unit and the polarization combining unit are integrated with each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present invention is not limited to the embodiments.

[a] First Embodiment

Figure 1:
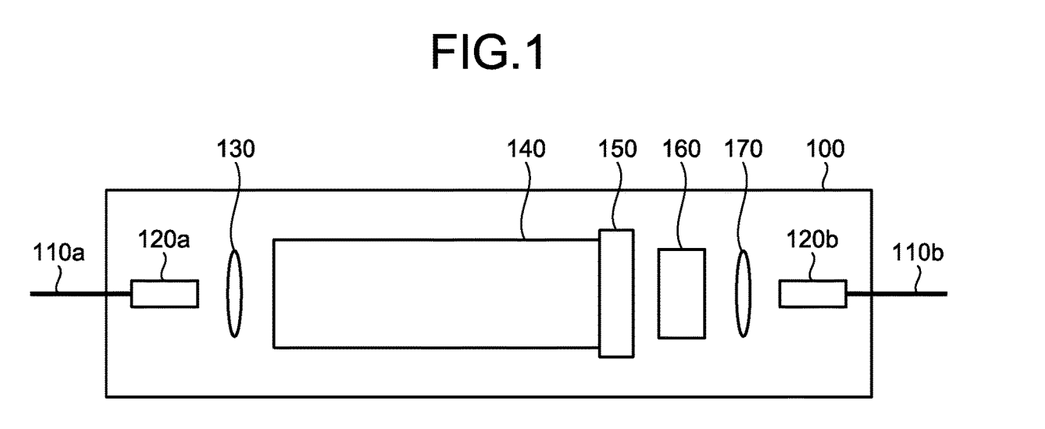
FIG. 1 is a diagram illustrating an example of a configuration of an optical modulator according to a first embodiment.

FIG. 1 is a diagram illustrating a configuration of an optical modulator 100 according to a first embodiment. The optical modulator 100 is connected to optical fibers 110a and 110b. The optical modulator 100 includes ferrules 120a and 120b, an input-side lens 130, an optical modulator chip 140, output-side lenses 150 and 170, and a polarization coupling unit 160.

The ferrules 120a and 120b accommodate therein ends of the optical fibers 110a and 110b and fix the positions of the optical fibers 110a and 110b, respectively. For example, in the optical modulator 100, signal light is input from the optical fiber 110a and the ferrule 120a, and is output from the ferrule 120b and the optical fiber 110b.

The input-side lens 130 collects the signal light radiated from the end of the optical fiber 110a accommodated in the ferrule 120a, and outputs an obtained light beam to the optical modulator chip 140.

The optical modulator chip 140 is formed of a semiconductor material. The optical modulator chip 140 splits the light beam input from the input-side lens 130 into two light beams, and superimposes an electric signal on the two split light beams. The optical modulator chip 140 then outputs the two light beams having an electric signal superimposed thereon to the polarization coupling unit 160 via the output-side lens 150. The optical modulator chip 140 may also output a monitoring light beam for monitoring an operation of the optical modulator chip 140, other than the two light beams having an electric signal superimposed thereon.

A microlens array is exemplified as the output-side lens 150. The output-side lens 150 outputs, to the polarization coupling unit 160, the light beams having an electric signal superimposed thereon by the optical modulator chip 140. That is, the output-side lens 150 outputs two light beams that travel in parallel to each other to the polarization coupling unit 160. The polarization directions of the two light beams output from the output-side lens 150 are the same.

The polarization coupling unit 160 combines the two light beams output from the output-side lens 150, and outputs a light beam including two polarized waves of which the polarization direction are perpendicular to each other. That is, the polarization coupling unit 160 rotates the polarization direction of one light beam output from the output-side lens 150, thereafter combines the one light beam with the other light beam, and outputs an obtained one light beam. In the present embodiment, there is no fillet formed of a fixing agent between the two light beams incident on the polarization coupling unit 160, and thus it is possible to have the two light beams close to each other. As a result, even if downscaling of the optical modulator chip 140 is maximized, it is possible to combine the two light beams output from the optical modulator chip 140 with each other by the polarization coupling unit 160. The specific configurations of the polarization coupling unit 160 are described later in detail.

The output-side lens 170 radiates the light beam output from the polarization coupling unit 160 to the end of the optical fiber 110b accommodated in the ferrule 120b.

Figure 2:
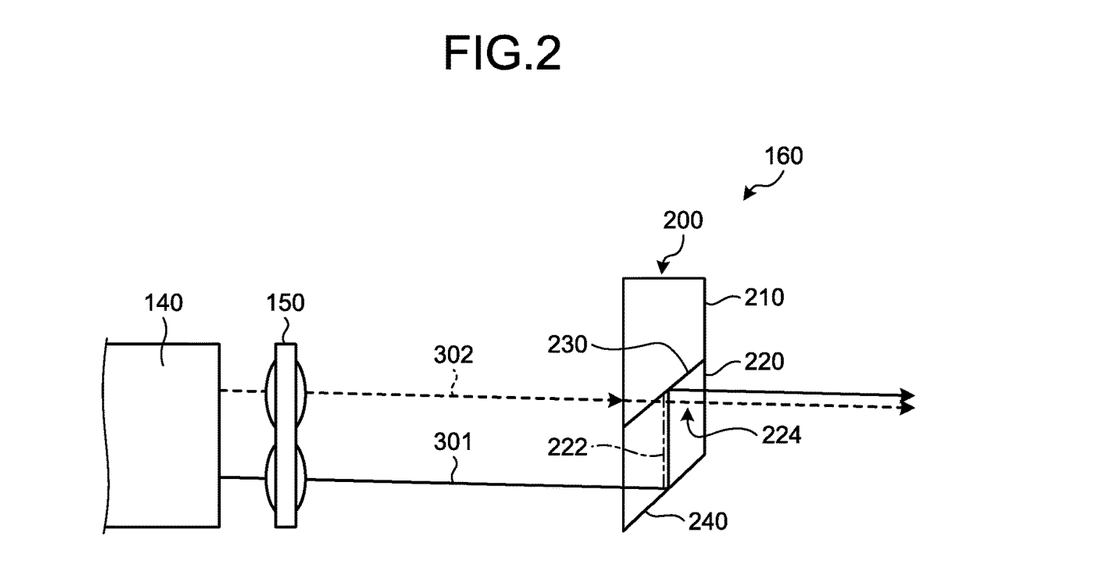
FIG. 2 is a top view illustrating an example of a configuration of a polarization coupling unit according to the first embodiment.

FIG. 2 is a top view illustrating an example of the configuration of the polarization coupling unit 160 according to the first embodiment. The polarization coupling unit 160 includes a polarization combining element 200, a polarization beam splitter film 230, and a mirror 240.

The polarization combining element 200 includes prisms 210 and 220.

The prism 210 is formed of a glass material or a birefringent material. The shape of the prism 210 is a trapezoid as viewed from above.

The prism 220 is formed of a birefringent material. The shape of the prism 220 is a parallelogram as viewed from above.

The prism 220 includes a polarization rotating unit 222 (a dashed dotted line in FIG. 2) and a polarization combining unit 224. The polarization rotating unit 222 rotates the polarization direction of a light beam 301 (a solid line in FIG. 2) incident on the polarization combining element 200. The polarization combining unit 224 combines the light beam 301 with the polarization direction rotated by the polarization rotating unit 222 and a light beam 302 (a dotted line in FIG. 2) incident on the polarization combining element 200 with each other.

A first surface of the prism 220 and a second surface thereof that is a parallel surface opposed to the first surface respectively correspond to a starting point and an ending point of a section in which the polarization rotating unit 222 rotates the polarization direction of the light beam 301. In the present embodiment, the mirror 240 is provided on the first surface of the prism 220. For example, the mirror 240 is formed of a polarization-independent reflection film formed on the first surface of the prism 220. The mirror 240 reflects the polarized wave of the light beam 301 incident on the polarization combining element 200 and causes the polarized wave to propagate to the polarization rotating unit 222.

The polarization beam splitter film 230 is provided between the prism 210 and the prism 220. For example, the polarization beam splitter film 230 is formed on the second surface of the prism 220. The polarization beam splitter film 230 has polarization selectivity and is also referred to as "polarization splitting film". The polarization beam splitter film 230 is formed of, for example, a dielectric multilayer film, and transmits light with its polarization plane parallel to an incident surface of the film (P-polarized light) and reflects light with its polarization plane perpendicular to the incident surface (S-polarized light). In the present embodiment, the polarization beam splitter film 230 reflects the polarized wave of the light beam 301 that has propagated to the polarization rotating unit 222, and transmits the polarized wave of the light beam 302 incident on the polarization combining element 200.

An operation of the polarization coupling unit 160 according to the first embodiment is described with reference to FIG. 2.

The light beams 301 and 302 having an electric signal superimposed thereon by the optical modulator chip 140 are output to the polarization coupling unit 160 from the output-side lens 150. At this time, the light beam 301 and the light beam 302 are incident as P-polarized light on the polarization combining element 200 of the polarization coupling unit 160, while travelling in parallel to each other.

The light beam 301 is incident on the prism 220 of the polarization combining element 200. The propagating direction of the light beam 301 is turned by the mirror 240 by 90 degrees. The light beam 301 turned by 90 degrees by the mirror 240 propagates to an approximately 45-degree direction with respect to the polarization beam splitter film 230. In the prism 220, a direction of an optical (crystal) axis of a birefringent material is set in such a manner that the polarization direction of the light beam 301 is rotated by approximately 90 degrees in the propagating direction of the light beam 301 from the mirror 240 to the polarization beam splitter film 230. That is, the polarization rotating unit 222 is provided in the prism 220. The polarization rotating unit 222 rotates the polarization direction of the light beam 301 by 90 degrees to make it perpendicular to the polarization direction of the light beam 302. In this manner, the polarized wave of the light beam 301 is turned from P-polarized light to S-polarized light. The polarization beam splitter film 230 reflects the polarized wave of the light beam 301, so that the propagating direction of the light beam 301 is turned by the polarization beam splitter film 230 by 90 degrees.

The light beam 302 is incident on the prism 210 of the polarization combining element 200 and propagates to the polarization beam splitter film 230 provided between the prism 210 and the prism 220. The polarization beam splitter film 230 transmits the polarized wave of the light beam 302. The polarization combining unit 224 of the prism 220 combines the light beam 301 (S-polarized light) and the light beam 302 (P-polarized light) with each other, and a combined light beam exits from the polarization coupling unit 160.

Figure 3:
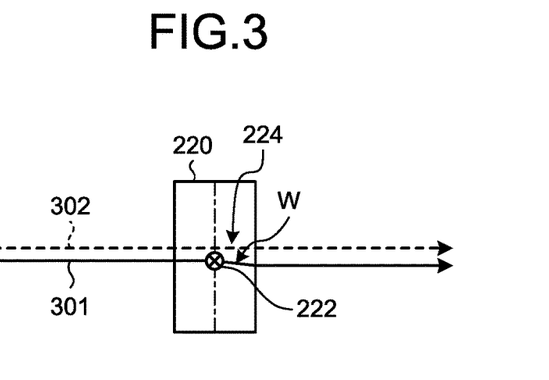
FIG. 3 is a side view illustrating an example of the configuration of the polarization coupling unit according to the first embodiment.

FIG. 3 is a side view illustrating an example of the configuration of the polarization coupling unit 160 according to the first embodiment. In the polarization combining element 200 of the polarization coupling unit 160, the prism 220 is formed of a uniaxial crystal as a birefringent material. In the present embodiment, a quartz crystal is used as the uniaxial crystal, for example.

After the polarization direction of the light beam 301 is rotated by approximately 90 degrees by the polarization rotating unit 222 (propagation in a direction perpendicular to the diagram of FIG. 3), the light beam 301 propagates in the polarization combining unit 224. Because the prism 220 is formed of a birefringent material, the light beam 301 with the polarization direction rotated propagates in the polarization combining unit 224 as extraordinary light, so that "Walk off" (a portion W in FIG. 3) is generated. "Walk off" is generated when a light beam propagates in a direction in which the light beam does not contribute to rotation due to the characteristics of a crystal axis. However, shifting of the propagating direction of the light beam 301 due to "Walk off" is slight, and is several micrometers (μm), for example.

Figure 4:
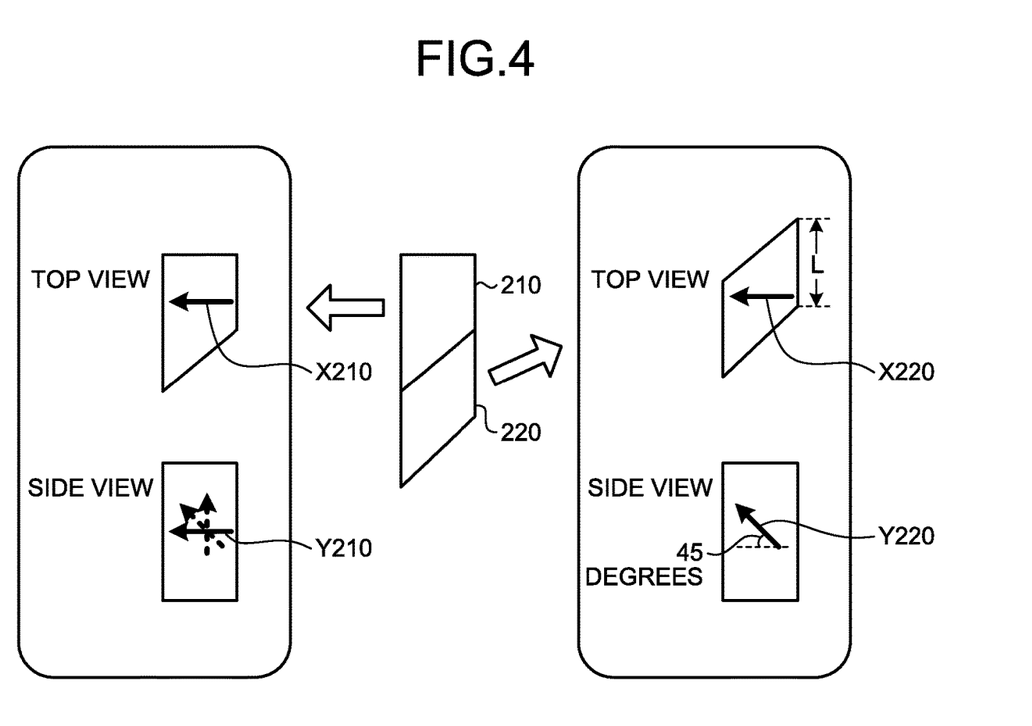
FIG. 4 is a diagram illustrating an example of a direction of an optical (crystal) axis of a birefringent material forming a prism of the polarization coupling unit according to the first embodiment.

FIG. 4 is a diagram illustrating an example of a direction of an optical (crystal) axis of a birefringent material forming a prism of the polarization coupling unit 160 according to the first embodiment. FIG. 4 explains a case where both the prisms 210 and 220 are formed of a birefringent material as an example.

The light beam 301 is incident on the prism 220 in the form of a parallelogram, and the propagating direction of the light beam 301 is turned by the mirror 240 by 90 degrees. The prism 220 is formed of a uniaxial crystal (for example, a quartz crystal) as described above. As the prism 220 is viewed from above, the axial direction of the prism 220 is set to be horizontal, that is, set to be 0 degree (see an arrow X220 in FIG. 4). As the prism 220 is viewed from its side, the axial direction of the prism 220 is set to be 45 degrees (see an arrow Y220 in FIG. 4).

Due to this configuration, the polarized wave of the light beam 301 (P-polarized light) is incident on the polarization rotating unit 222 of the prism 220 as 45-degree polarized light with respect to the optical crystal axis. Therefore, because of a difference in a refractive index between an optical-axis direction and a direction perpendicular thereto (birefringence), a propagation phase difference is generated in each light wave component. By setting the propagation distance in the polarization rotating unit 222 (an arrow L in FIG. 4, that is, the thickness of the prism 220) in such a manner that the propagation phase difference becomes π, the polarization direction of the light beam 301 is rotated by 90 degrees and the polarized beam of the light beam 301 is turned from P-polarized light to S-polarized light. The light beam 301 turned to S-polarized light is reflected by the polarization beam splitter film 230, so that the propagating direction of the light beam 301 is turned by 90 degrees. The polarization direction of the light beam 301 (S-polarized light) of which the propagating direction has been turned by 90 degrees is the same as the direction of the optical crystal axis. That is, on a portion of the polarization combining unit 224 of the prism 220, only an extraordinary light component is incident, and the direction of the optical crystal axis of crystal in the portion is set so as not to cause rotation of the polarized wave that is S-polarized light. Therefore, in the polarization combining unit 224 of the prism 220, the light beam 301 is combined as S-polarized light with the light beam 302 while the polarization of the light beam 301 is not rotated.

The light beam 302 is incident on the prism 210 in the form of a trapezoid. The prism 210 is formed of a uniaxial crystal (for example, a quartz crystal), similarly to the prism 220 in the form of a parallelogram. As the prism 210 is viewed from above, the axial direction of the prism 210 is set to be horizontal, that is, set to be 0 degree (see an arrow X210 in FIG. 4). As the prism 210 is viewed from its side, the axial direction of the prism 210 can be any direction (see an arrow Y210 in FIG. 4).

Due to this configuration, the polarization direction of the polarized wave of the light beam 302 (P-polarized light) incident on the prism 210 is perpendicular to the optical crystal axis. That is, on the prism 210, only an ordinary light component is incident, and the direction of the optical crystal axis of crystal is set so as not to cause rotation of the polarized that is P-polarized light. Therefore, in the prism 210, the polarized wave of the light beam 302 passes (is transmitted) through the polarization beam splitter film 230 as P-polarized light without being rotated. The polarization direction of the polarized wave (P-polarized light) of the light beam 302 that has passed through the polarization beam splitter film 230 is perpendicular to the optical crystal axis, also in a case where it is incident on the prism 220 in the form of a parallelogram. That is, on a portion of the prism 220 serving as the polarization combining unit 224, only an ordinary light component is incident, and the direction of the optical crystal axis of crystal in that portion is set so as not to cause rotation of the polarized wave that is P-polarized light. Therefore, in the polarization combining unit 224 of the prism 220, the polarization of the light beam 302 is not rotated, and the light beam 302 is combined as P-polarized light with the light beam 301.

In addition, by setting a surface (first surface) of the mirror 240 and a surface (second surface) of the polarization beam splitter film 230 in the prism 220 in the form of a parallelogram to be parallel to each other, uniform polarization rotation can be achieved for the entire effective diameter of an incident light beam.

Further, the distance (see the arrow L in FIG. 4) from the surface (first surface) of the mirror 240 to the surface (second surface) of the polarization beam splitter film 230 provided in the prism 220 in the form of a parallelogram is the propagating distance when the polarization direction of the light beam 301 is rotated by 90 degrees by the polarization rotating unit 222. A distance L is set to a value larger than the effective beam diameter of the light beam 301. For example, when quartz crystal is selected as a birefringent material, the distance L can be selected to be an odd multiple of about 90 μm, and it is possible to achieve size reduction of the beam diameter to 90 μm or less, reduction of the pitch of beams that travel in parallel to each other, and downscaling of the polarization combining element 200.

As described above, according to the present embodiment, the polarization coupling unit 160 of the optical modulator 100 includes the polarization combining element 200, and the polarization combining element 200 includes the prisms 210 and 220. In the prism 220, the polarization rotating unit 222 and the polarization combining unit 224 are integrated with each other. The polarization rotating unit 222 rotates the polarization direction of the light beam 301 incident on the polarization combining element 200 when the light beam 301 passes therethrough. The polarization combining unit 224 combines the light beam 301 with the polarization direction rotated by the polarization rotating unit 222 and the light beam 302 incident on the polarization combining element 200 with each other. In this manner, in the present embodiment, the prism 220 is formed by integrating the polarization rotating unit 222 and the polarization combining unit 224 with each other, thereby advancing downscaling of the device.

Further, unlike conventional techniques, in the present embodiment, any base member does not need to be provided. Specifically, in conventional techniques, a waveplate and a PBC prism are bonded to a base member so as not to form a fillet that is formed by bonding the waveplate and the PBC prism to each other with a fixing agent such as an adhesive. On the other hand, in the present embodiment, the prism 220 is formed by integrating the polarization rotating unit 222 having functions of conventional waveplates and the polarization combining unit 224 having functions of conventional PBC prisms with each other. In this manner, unlike conventional techniques, in the present embodiment, it is possible to reduce the distance between the two light beams 301 and 302 to a certain value or less without providing any base member. Further, in the present embodiment, traveling of the light beams 301 and 302 is not blocked by a fillet.

[b] Second Embodiment

Figure 5:
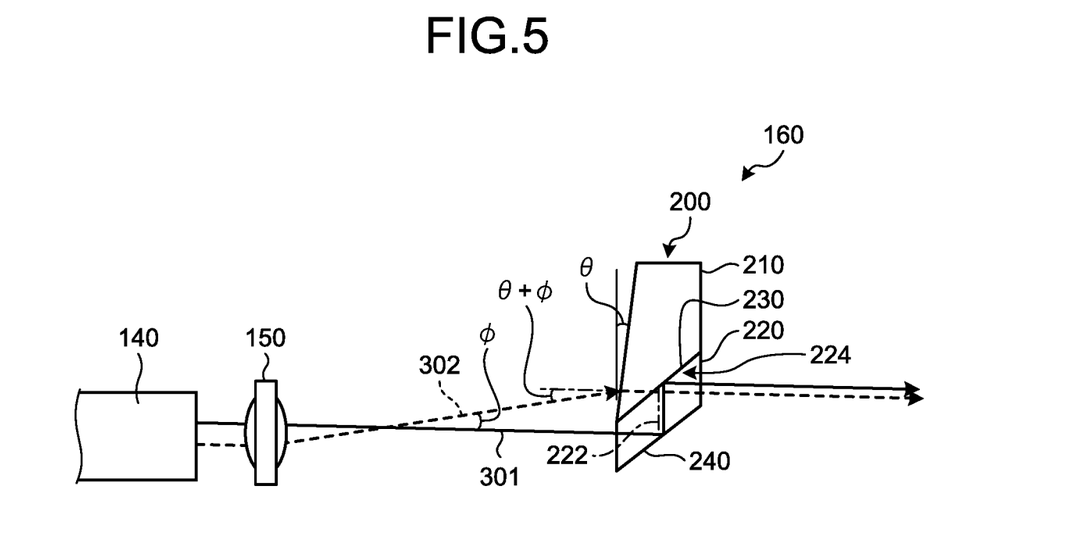
FIG. 5 is a top view illustrating an example of a configuration of a polarization coupling unit according to a second embodiment.

FIG. 5 is a top view illustrating an example of the configuration of the polarization coupling unit 160 according to a second embodiment. In the second embodiment, explanations of configurations and operations identical to those of the first embodiment are omitted.

In the polarization coupling unit 160, angles are provided to incident surfaces of the polarization combining element 200, on which the light beams 301 and 302 are incident. For example, the light beam 302 is incident on an incident surface of the prism 210, and an angle $\theta$ is set for the incident surface of the prism 210. The light beam 301 is incident on an incident surface of the prism 220, and an angle of 0 degree is set for the incident surface of the prism 220. In this case, the angle $\theta$ is set to make the propagating directions of the light beams 301 and 302 equal to each other when the light beams 301 and 302 are combined with each other by the polarization combining unit 224.

An operation of the polarization coupling unit 160 according to the second embodiment is described with reference to FIG. 5.

The light beams 301 and 302 having an electric signal superimposed thereon by the optical modulator chip 140 are output to the polarization coupling unit 160 from the output-side lens 150. At this time, the light beams 301 and 302 are, while crossing each other, incident as P-polarized light on the polarization combining element 200 of the polarization coupling unit 160. In this description, a crossing angle between the light beam 301 and the light beam 302 is set to as $\phi$.

The light beam 301 is incident on the incident surface of the prism 220 of the polarization combining element 200 with an incident angle of approximately 0 degree. The traveling manner of the light beam 301 from incidence on the prism 220 of the polarization combining element 200 to reflection by the polarization beam splitter film 230 is the same as that in the first embodiment.

The light beam 302 is incident on the incident surface of the prism 210 of the polarization combining element 200 with an incident angle of approximately $\theta+\phi$ degrees. For example, when the prism 210 is formed of a quartz crystal (a refractive index for P-polarized light is 1.53), the crossing angle $\phi$ between the light beam 301 and the light beam 302 is set to 3.2 degrees, and the angle $\theta$ of the incident surface of the prism 210 is set to 6 degrees. Thereafter, the light beam 302 is refracted by the incident surface of the prism 210, and propagates to an approximately 45-degree direction with respect to the polarization beam splitter film 230 provided between the prism 210 and the prism 220. The polarization beam splitter film 230 transmits the polarized wave of the light beam 302. In the polarization combining unit 224 of the prism 220, the light beam 301 (S-polarized light) and the light beam 302 (P-polarized light) propagate in substantially the same directions, and a combined light beam exits from the polarization coupling unit 160.

Figure 6:
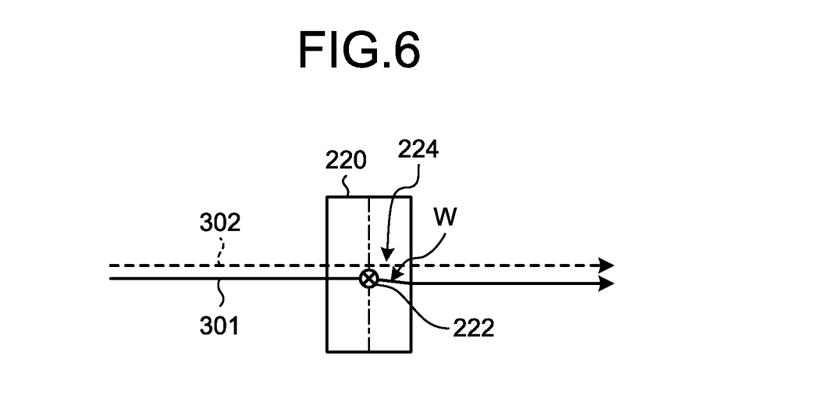
FIG. 6 is a side view illustrating an example of the configuration of the polarization coupling unit according to the second embodiment.

FIG. 6 is a side view illustrating an example of the configuration of the polarization coupling unit 160 according to the second embodiment. Similarly to the first embodiment, after the polarization direction of the light beam 301 is rotated by approximately 90 degrees by the polarization rotating unit 222 (propagation in a direction perpendicular to the diagram of FIG. 6), the light beam 301 propagates in the polarization combining unit 224. In this case, because the prism 220 is formed of a birefringent material, the light beam 301 with the polarization direction rotated propagates in the polarization combining unit 224 as extraordinary light, so that "Walk off" (a portion W in FIG. 6) is generated. However, shifting of the propagating direction of the light beam 301 due to "Walk off" is slight, and is several micrometers, for example.

As described above, according to the present embodiment, an optical system using crossing light beams can be selected in addition to the effect of the first embodiment, and it is possible to achieve large reduction of the pitch between the two light beams 301 and 302 and downscaling of the polarization combining element 200 and the optical modulator chip 140, and to further achieve downscaling of the entire optical system.

Although each of the embodiments described above has described the polarization coupling unit 160 provided in the optical modulator 100, the polarization coupling unit 160 according to the respective embodiments can be also applied to various types of optical modules different from an optical modulator. That is, it is possible to use the polarization coupling unit 160 according to the respective embodiments described above in an optical module, as long as the optical module combines two light beams or splits one light beam.

Further, in each of the embodiments described above, although a quartz crystal as a birefringent material forming a prism of the polarization combining element 200 of the polarization coupling unit 160 is used, the birefringent material is not limited thereto. As the birefringent material, it is also possible to use sapphire, rutile, YVO4 (yttrium orthovanadate), and the like.

According to an aspect of the polarization coupling device and the optical modulation device disclosed in the present application, there is an effect where downscaling of the device can be advanced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A polarization coupling device comprising a polarization combining element, wherein
the polarization combining element includes:
a first prism that propagates a first polarized wave incident on the polarization combining element; and
a second prism that propagates a second polarized wave incident on the polarization combining element in a first direction and a second direction, rotates a polarization direction of the second polarized wave propagating in the first direction, and combines the first polarized wave and the second polarized wave propagating in the second direction, and
the first prism and the second prism are integrated with each other.

2. The polarization coupling device according to claim 1, wherein
the second prism is formed of a birefringent material, and
a direction of an optical axis of the birefringent material is set so as not to cause rotation of the first polarized wave and the second polarized wave propagating in the second direction.

3. The polarization coupling device according to claim 1, further comprising:
a mirror that is provided on a first surface of the second prism and reflects the second polarized wave incident on the polarization combining element to cause the second polarized wave to propagate in the first direction; and a polarization splitting film that is provided on a second surface of the second prism, reflects the second polarized wave having propagated in the first direction to cause the polarized wave to propagate in the second direction, and transmits the first polarized wave incident on the polarization combining element.

4. The polarization coupling device according to claim 3, wherein a propagation distance from the first surface to the second surface when the polarization direction of the second polarized wave is rotated by the second prism is larger than an effective beam diameter of the second polarized wave.

5. The polarization coupling device according to claim 1, wherein angles are provided to incident surfaces of the polarization combining element on which the first and second polarized waves are respectively incident, and the angles are set such that propagating directions of the first and second polarized waves are equal to each other when the first and second polarized waves are combined by the second prism.

6. An optical modulation device comprising:

a modulating unit that superimposes an electric signal on light and outputs first and second light beams each of which has an electric signal superimposed thereon; and a polarization coupling device that combines the first and second light beams output from the modulating unit, wherein the polarization coupling device includes a polarization combining element, the polarization combining element includes:

a first prism that propagates the first light beam incident on the polarization combining element; and a second prism that propagates the second light beam incident on the polarization combining element in a first direction and a second direction, rotates a polarization direction of the second light beam propagating in the first direction, and combines the first light beam and the second light beam propagating in the second direction, and the first prism and the second prism are integrated with each other.

* * * * *